United States Patent [19]

McCurdy

[11] Patent Number: 4,962,833
[45] Date of Patent: Oct. 16, 1990

[54] BRAKE SYSTEM FOR A WHEELBARROW

[76] Inventor: Kal B. McCurdy, 20 Roberts Ave., San Rafael, Calif. 94901

[21] Appl. No.: 416,725

[22] Filed: Oct. 3, 1989

[51] Int. Cl.⁵ .................... B62B 5/04; F16D 65/30
[52] U.S. Cl. ................... 188/2 R; 188/21; 188/114; 188/132; 280/47.31
[58] Field of Search ............ 188/2 R, 19, 21, 22, 188/110, 114, 117, 119, 132, 167, 168, 169; 280/47.31; 298/3

[56] References Cited

U.S. PATENT DOCUMENTS

| | | |
|---|---|---|
| 444,519 | 1/1891 | Briggs . |
| 779,011 | 1/1905 | Stuart et al. . |
| 780,887 | 1/1905 | Jacobs . |
| 1,015,078 | 1/1912 | Robinson . |
| 1,424,273 | 8/1922 | Arato .................... 188/169 |
| 2,018,527 | 10/1935 | Kerr . |
| 3,190,401 | 6/1965 | Bigley et al. .............. 188/167 |
| 3,950,005 | 4/1976 | Patterson ............... 280/47.31 |

FOREIGN PATENT DOCUMENTS 986472  3/1951  France ................. 188/132

Primary Examiner—Duane A. Reger
Attorney, Agent, or Firm—Norman B. Rainer

[57] ABSTRACT

A friction brake is associated with the single wheel of a wheelbarrow. A cable extends from the brake to a belt having a quick release mechanism and worn by the operator of the wheelbarrow. When tension is applied to the cable, as when the wheelbarrow moves away from the operator, braking force is applied to the wheel.

5 Claims, 3 Drawing Sheets

4,962,833

BRAKE SYSTEM FOR A WHEELBARROW

BACKGROUND OF THE INVENTION

This invention concerns a brake system for a wheel/barrow of substantially conventional design, and more particularly relates to a brake system interactive with the operator of a wheelbarrow to control downward motion of a wheelbarrow on inclined terrain.

Wheelbarrows are generally comprised of an open top tub-like container mounted upon two rigid handle members whose lowermost extremities join at the axle of a wheel centered below the forward portion of the container. The uppermost extremities of the handle members extend rearwardly of the container and are spaced apart to enable the operator of the wheelbarrow to walk behind the container and between the handles. The wheel may be equipped with a pneumatically inflatable rubber tire.

Stantion means such as paired legs are provided beneath the rear extremity of the container to permit loading of the container while it is resting upon the ground, unsupported by the operator. When the container is filled with materials such as rocks, soil, cement or other materials, the contents of the container are of considerable weight. The handles provide adequate leverage for the operator to lift the weight of the wheelbarrow off the stantion means and place it on the wheel so that rolling motion can begin. However, in going down inclined terrain or surfaces, the rolling momentum may become too much for the operator to control.

Various brake means are well known for wheeled vehicles. Such brake systems generally comprise a replaceable friction pad or lining interactive with a rotating surface such as a disc or drum centered about the wheel axis. The friction lining is generally affixed to a shoe structure adapted to controllably force the friction lining against the rotating surface. In automotive vehicles, pistons activated by hydraulic pressure are utilized to force the friction shoes into braking action. The hydraulic pressure in turn is controlled by a foot pedal, or handgrips as in the case of motorcycles.

In order to control a wheelbarrow that is about to enter a runaway condition, the operator is not easily able to use his hands or feet to manipulate a braking device.

It is accordingly an object of the present invention to provide a brake system for a wheelbarrow.

It is a further object of this invention to provide a brake system as in the foregoing object which may be activated without involvement of the hands or feet of the operator of the wheelbarrow.

It is another object of the present invention to provide a brake system of the aforesaid nature which is readily installable upon wheelbarrows of conventional design.

It is yet another object of this invention to provide a brake system of the aforesaid nature of rugged durable design and amenable to low cost manufacture.

These objects and other objects and advantages of the invention will be apparent from the following description.

SUMMARY OF THE INVENTION

The above and other beneficial objects and advantages are accomplished in accordance with the present invention by a brake system for a wheelbarrow comprising a tub-like container, a supporting framework having two elongated handles and support legs, and a wheel positioned below the forward extremity of said container and rotatively held by an axle journaled to the handles adjacent the lowermost extremities thereof, said brake system comprising:

(a) a stationary plate disposed upon said axle in perpendicular disposition thereto, (b) means for anchoring said plate to an adjacent handle, (c) an arcuate lever pivotably attached at a first extremity to said plate, and having an opposite second extremity having cable-engaging means, (d) a friction brake lining in the shape of an arc of a circle resiliently associated with said plate and adapted to be contacted by the pivoted extremity of said lever and thereby urged radially outward from said plate, (e) a drum surface attached to said wheel and rotatable therewith, said drum surface having a radius to match the arc of said lining, and positioned to be contacted by said lining when outwardly urged by said lever, (f) a cable having a proximal extremity which attaches to the second extremity of said lever and extends rearwardly through guide means within said framework to a free distal extremity, and (g) a belt having quick release means and adapted to be worn by the operator of the wheelbarrow, said belt being attached to the distal extremity of said cable, whereby, (h) when the cable is pulled, as when the wheelbarrow is separated from the operator, the lever forces the lining into contact with the drum surface, thereby preventing movement of the wheelbarrow.

BRIEF DESCRIPTION OF THE DRAWING

For a fuller understanding of the nature and objects of the invention, reference should he had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
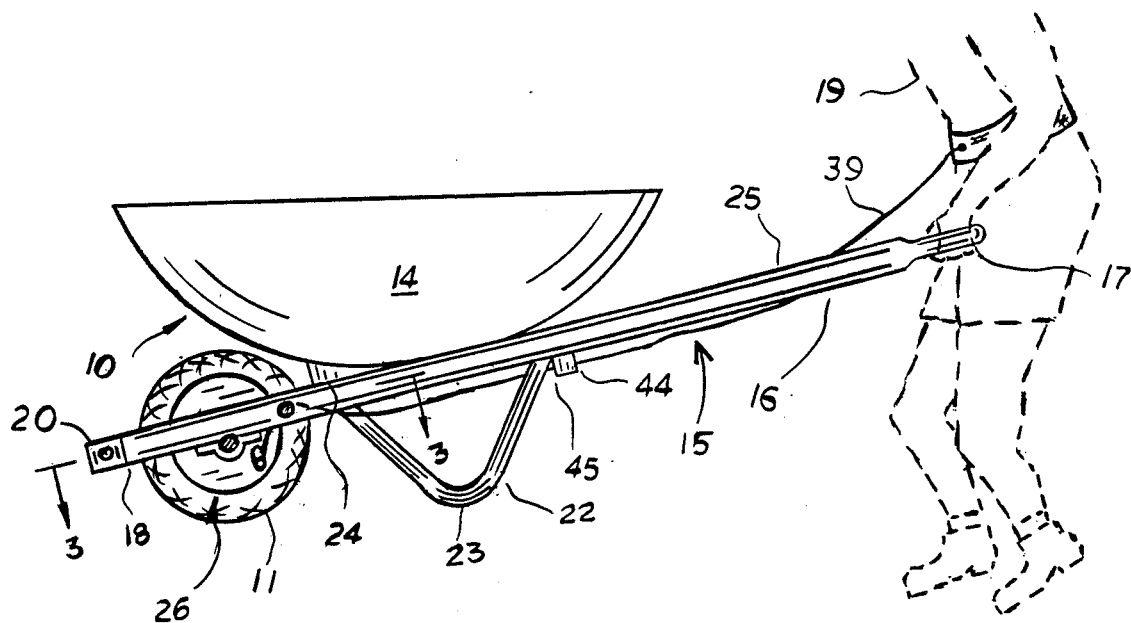
FIG. 1 is a side view showing an embodiment of the brake system of the present invention in operative association with a wheelbarrow of substantially conventional design.

Referring to FIGS. 1–5, an embodiment of the brake system of the present invention is shown installed in wheelbarrow 10 having pneumatic tire 11 mounted upon rimmed wheel 12 rotatably supported by horizontally disposed axle 13. A tub-like container 14 is supported by framework 15 having paired elongated handles 16 that are angularly convergent as they extend from uppermost extremities 17 to lowermost extremities 18. Said uppermost extremities are somewhat narrowed and rounded to facilitate gripping by the hands of the operator 19. Lowermost extremities 18 are bridged by a nose strap 20 which affords protective and strengthening advantages. Wedges 24 positioned upon upper surfaces 25 of the handles raise the container at an upward angle divergent from the handles.

Axle 13 is journaled to handles 16 by brackets 21 bolted to the underside of the handles adjacent lowermost extremities 18. Paired support legs 22 fashioned of bent iron bars are bolted to the underside of the handles in a manner to substantially center bottom portions 23 of said legs beneath container 14.

When the wheelbarrow is at rest upon a level surface, it is supported by the tire and the legs in a manner placing the container in a substantially horizontal disposition.

Figure 2:
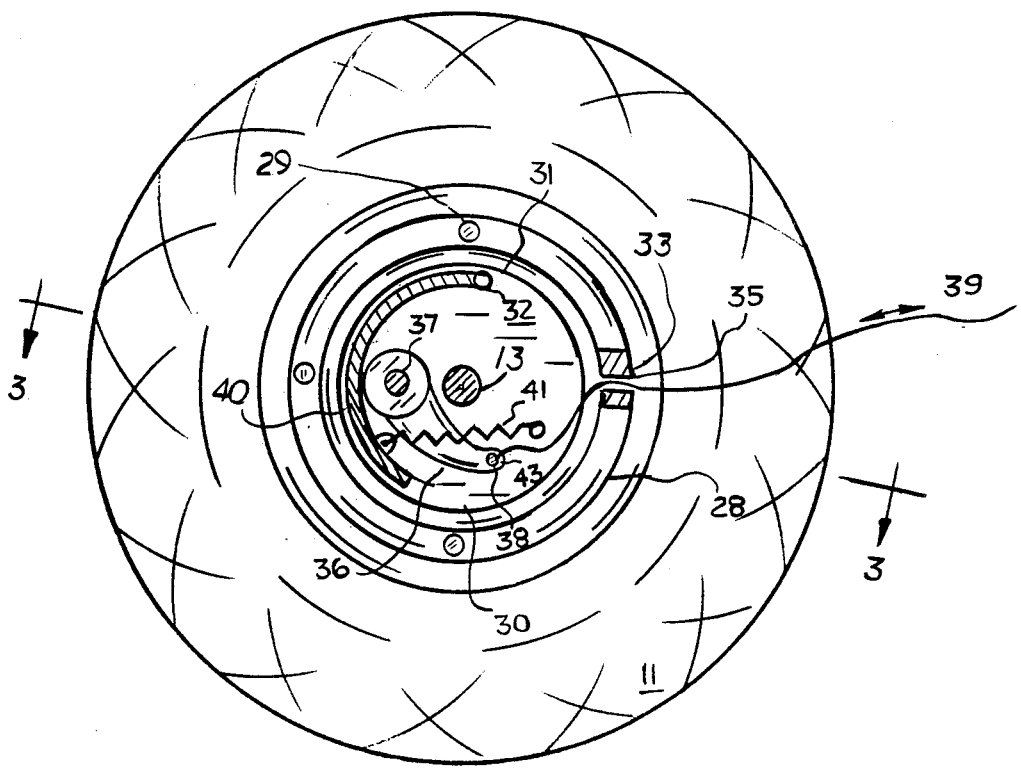
FIG. 2 is an enlarged fragmentary side view showing details of features associated with the wheel of the wheelbarrow.
Figure 3:
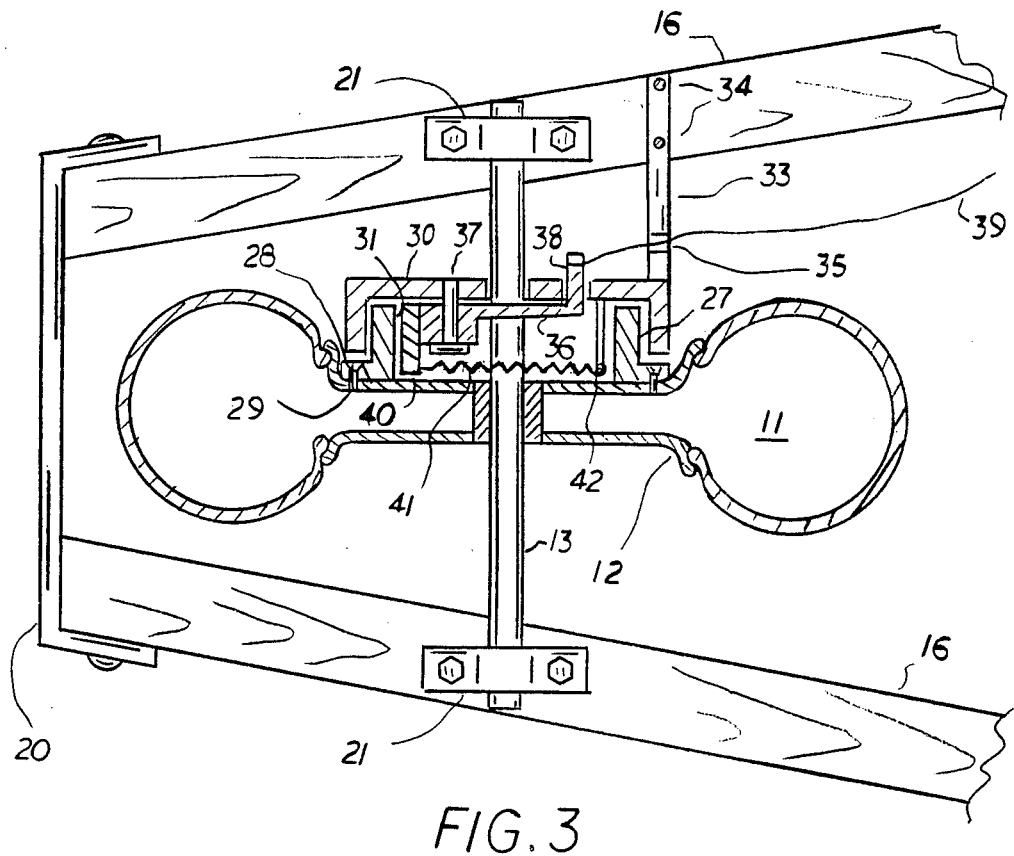
FIG. 3 is an enlarged sectional view taken upon the line 3—3 of FIG. 1.
Figure 4:
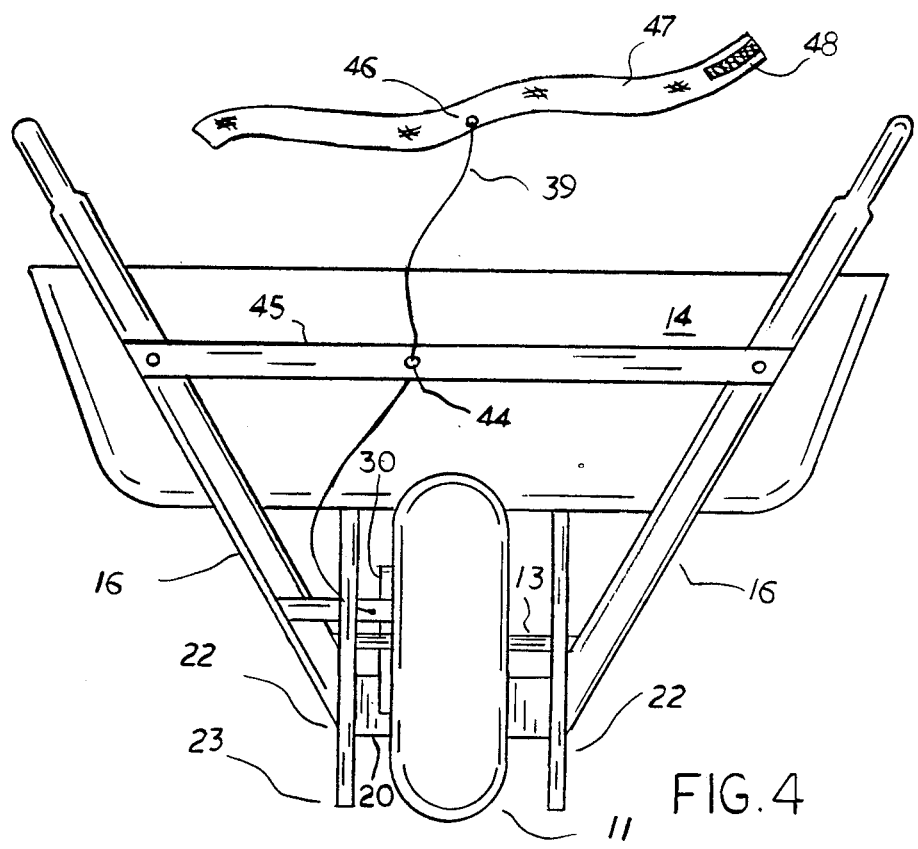
FIG. 4 is a rear view of the brake system of FIG. 1.
Figure 5:
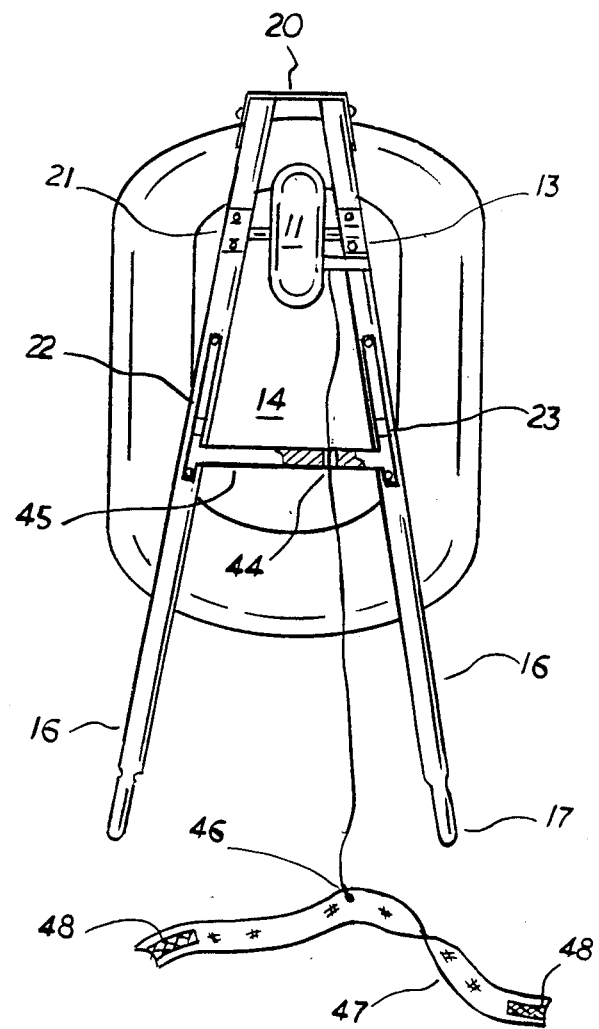
FIG. 5 is a bottom view of the system of FIG. 1.

The brake system of this invention, as shown most clearly in FIGS. 2 and 3, comprises a friction-type brake assembly 26 attached to at least one side of wheel 12. The exemplified embodiment employs a drum member 27 annularly disposed about axle 13 and integral with mounting flange 28 which is joined to wheel 12 by bolts 29. The drum member has a cylindrical inner abutment surface 31 that faces the axle.

A stationary plate 30 is disposed upon axle 13. An arm 33, attached to plate 30 is joined by bolts 34 to a handle 16. An aperture 35 is located in arm 33, and serves as a guide for a control cable, as will hereinafter be shown.

An arcuate lever 36 is secured upon plate 30 by means of pivot bolt 37 which engages a first extremity of said lever, and permits movement of said lever within a plane parallel to plate 30. The second extremity of lever 36 is provided with apertured tab 38 intended to permit attachment to control cable 39.

A friction brake lining 40 in the shape of an arc of a circle is joined by pivot pin 32 to plate 30. The free distal extremity of the brake lining is attached to coil spring 41 which biases said brake lining toward the axle. The brake lining is positioned to be contacted by the pivoted extremity of said lever, and thereby be urged radially outward into contact with abutment surface 31 of drum member 27. Brake lining 40 preferably has a radius of curvature which matches the curvature of abutment surface 31.

Control cable 39 has a proximal extremity 43 which attaches to apertured tab 38 in the second extremity of lever 36. From the proximal extremity, the cable extends rearwardly through aperture 35, thence through guide channel 44 centered in traverse strut 45, and thence to a free distal extremity 46. Strut 45, extending between handles 16, constitutes a portion of the general framework of the wheelbarrow.

A belt 47 is attached to distal extremity 46 of said control cable. The belt is provided with hook and loop type attachment material 48, thereby enabling the belt to be easily fitted to the operator and also quickly releasible. Suitable hook and loop type attachment material is commercially available under the trademark VELCRO from the Velcro Corporation of N.Y. Such hook and loop attachment or fastening material are Paired interactive members, each comprising a compliant base sheet having an upraised pile of synthetic fibers. The fibers of one member are in the form of loops. The fibers of the other interactive member are cut loops, which constitute hooks. When the two members of the fastening system are pressed together in face-to-face relationship, there is substantial engagement of hook fibers with loop fibers. A considerable effort must be applied to separate the members unless they are peeled apart, in which event the members are easily separated.

By virtue of the aforesaid components and their specialized manner of interaction, the operator can slow or stop the forward motion of the wheelbarrow merely by allowing the wheelbarrow to ride further from his body. Such action causes a pulling effect upon the control cable, which in turn forces the brake lining into contact with the drum.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A brake system for a wheelbarrow comprising a tub-like container, a supporting framework having two elongated handles and support legs, and a wheel positioned below the forward extremity of said container and rotatively held by an axle journaled to the handles adjacent the lowermost extremities thereof, said brake system comprising:
   (a) a stationary plate disposed upon said axle in perpendicular disposition thereto,
   (b) means for anchoring said plate to an adjacent handle,
   (c) an arcuate lever pivotably attached at a first extremity to said plate, and having an opposite second extremity having cable-engaging means,
   (d) a friction brake lining in the shape of an arc of a circle movably associated with said plate and adapted to be contacted by the pivoted first extremity of said lever and thereby urged radially outward from said plate,
   (e) a drum surface attached to said wheel and rotatable therewith, said drum surface having a radius to match the arc of said lining, and positioned to be contacted by said lining when outwardly urged by said lever,
   (f) a cable having a proximal extremity which attaches to the second extremity of said lever and extends rearwardly to a free distal extremity, and
   (g) a belt having quick release means and adapted to be worn by the operator of the wheelbarrow, said belt being attached to the distal extremity of said cable, whereby
   (h) when the cable is pulled, as when the wheelbarrow is separated from the operator, the lever forces the lining into contact with the drum surface, thereby preventing movement of the wheelbarrow.

2. The brake system of claim 1 wherein said friction brake lining is associated with spring means attached to said plate in a manner to cause said friction brake lining to resist th outward urging of the pivoted first extremity of said lever 3. The brake system of claim 1 wherein said means for anchoring said plate to an adjacent handle is a rigid arm having an aperture through which said cable passes 4. The brake system of claim 1 wherein said cable engages guide means within said framework.

5. The brake system of claim 1 wherein the quick release means of said belt is comprised of hook and loop type attachment material which enables the belt to be easily fitted to the operator.

* * * * *